Apr. 24, 1923.
C. E. KISTNER
1,452,916
DIRIGIBLE AUTOMOBILE LAMP DEVICE
Filed June 20, 1921
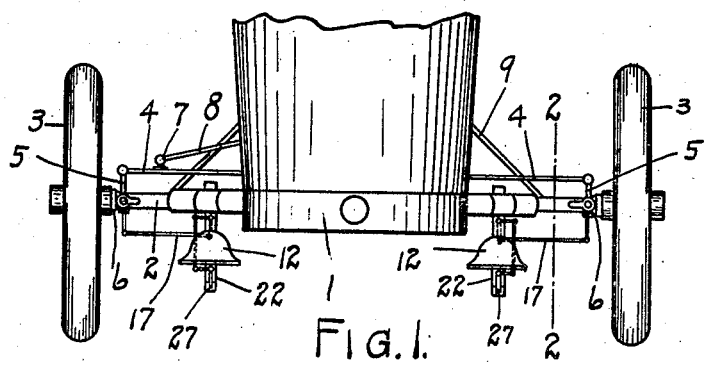
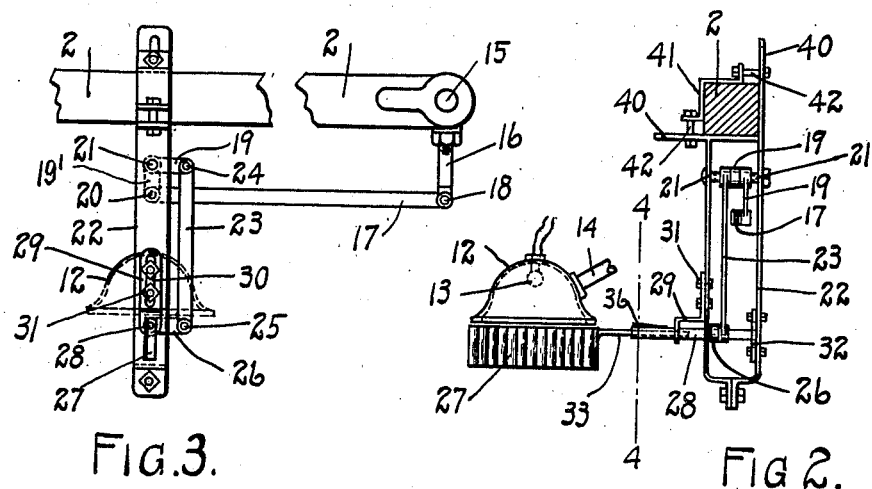

Patented Apr. 24, 1923.

1,452,916

UNITED STATES PATENT OFFICE.

CHARLES E. KISTNER, OF CINCINNATI, OHIO.

DIRIGIBLE AUTOMOBILE LAMP DEVICE.

Application filed June 20, 1921. Serial No. 479,106.

*To all whom it may concern:*

Be it known that I, CHARLES E. KISTNER, a citizen of the United States, residing at the city of Cincinnati, county of Hamilton, and State of Ohio, have invented certain new and useful Improvements in Dirigible Automobile Lamp Devices, of which the following is a specification.

My invention is more particularly adapted for use in connection with lamps or lights of automobiles, motor trucks or any motor driven vehicles or apparatus, and the present invention is an improvement on a device set forth in an application filed by me in the United States Patent Office on March 22nd, 1921, Serial No. 455,090.

The object of my invention is to so arrange the lamps of the vehicle, that when said vehicle turns in any direction, the rays of light from the lamps will be forced to follow the path of the vehicle; thus the light rays will always be directed in the path of the same, no matter what its course or direction.

It consists essentially in producing a light ray directing or shifting member, combined with the rigid stationary lamps of the vehicle; it further consists in means which are adjustable so that the device can be applied to the vehicle in connection with the lamps or lights, whether they are connected down low or higher up on the framework of said vehicle.

My device consists partly in placing a shutter vertically in front of the lamps and in employing mechanism, intermediate between said shutter and the inner hub of the vehicle wheel, to swing said shutter completely, so that the rays of light will not be curtailed but will be given full sweep to carry out the direction of the wheels, and thus throw the rays perfectly and properly to follow the direction of said wheels; and in means for adjusting the shutters vertically and horizontally.

My invention further consists in a peculiarly formed deflector or shutter.

In the drawing, forming part of this specification:

Fig. 1, is a plan view of the front part of the automobile, showing my invention in normal position, Fig. 2, is a side view of the mechanism, the axle to which it is attached being shown in section, Fig. 3, is a plan view of the mechanism shown in Fig. 2, the axle shown broken away, Fig. 4, is a sectional view, taken on the lines 4—4 of Fig. 2, and Fig. 5, is a sectional view, taken on the lines 5—5 of Fig. 4.

In the drawing, the radiator is marked 1, the axle 2 and the wheels 3, only enough of the automobile being shown which is necessary to explain the invention. To the axle 2, at each side adjacent to the wheels 3, I pivotally connect the usual connecting rod 4, through the short arms 5, which are connected to the inner hub end 6.

At the point 7, I connect one end of a connecting arm 8, which arm, at its opposite end is connected to the steering rod (not shown), and connecting and brace rods are marked 9; the construction just set forth is one of a usual form and well known in the art.

The lamps are marked 12 and the electric globe therein 13; these lamps are of any of the usual forms and are provided with the usual reflectors.

The lamps are positioned on the lamp supporting rods 14, connected to said lamps as usual. The lamps are held in usual manner on brackets on the frame of the machine.

In carrying out my invention, I attach to the knuckle joint 15 at each side, an extending arm 16, which connects to a long link 17 at point 18; this link connects to bell crank lever 19 at point 20, the bell crank lever being fulcrumed at point 21; through the forward extending bracket 22 this bell crank lever 19 connects at its other end to a link 23 at point 24 and at its other end at point 25 is connected to a rocking lever or arm 26; this rock arm rocks the deflector 27 through arm 28. This mechanism just described is the operating means for shifting the shutters and will be more fully set forth hereinafter.

The deflector arm 28 is held in position by means of an adjusting bracket 29 which is slotted at 30, in this manner the deflector can be brought closer to or away from the lamps 12, so that the proper position can always be obtained for the deflector. By loosing the bolts 31, the bracket 29 can be slid back and forth to the desired position, and to retain a parallel adjustment, however, I provide a sliding plate 32 at the bottom of rod 28 as shown. The above means is provided for a horizontal adjustment.

To obtain a vertical adjustment for the deflector, I provide a telescoping rod and sleeve 33 and 34; to produce this proper adjustment, I provide the rod 33 with teeth as 35 into and between which a tooth 36 on a spring 37 engages; spring 37 being connected to tube 34 at point 38; the spring and tooth are pulled out at the loose end and placed into another tooth space 35 when another vertical position is desired.

To provide for the connection of my device to various sized axles, I use two angle shaped parts 40 and 41, which can be opened and closed on different sized axles through medium of bolt and nut connections 42, and shifting of the piece 41 to encompass the axle to which the device is to be applied.

The deflector 27 is connected to the arm 33 in any desirable manner, however, being rigidly attached so that it will move with said arm when said arm is turned or rocked; said deflector 27 is preferably made corrugated as shown in Fig. 2 so that it will have an increased deflecting area and will assist in throwing the light rays. In use, when the wheels of the automobile turn the rods 16 are operated, inasmuch, as they are attached to the knuckle joint 15 at the inner hub of the wheel; this operation operates the long links 17 which in turn operates the bell cranks 19 and these bell cranks impart motion to the links 23 and these links 23 rock the rock shaft 26, and the standards or arms 33 upon which the deflectors 27 are mounted or rocked, and thus the deflectors are rocked or forced to make a sweep to the right or to the left throwing the rays of light to the right or left; the light rays shifting gradually on the path traveled by the wheels thus throwing the light rays continuously and gradually upon the road to show in what direction the automobile is going, or is about to take, and also lighting the path during the entire turning motion of the automobile. By this motion the arc of a circle or turn described by the wheels is absolutely transmitted to the shutters or deflectors 27.

Inasmuch as the arm 16 is longer than the arm $19^1$ of the bell crank 19, the said arm $19^1$ will operate faster than said arm 16, and consequently the shutters 27 will be operated faster than the wheels turn, through the mechanism above described; thus the rays of light will begin to be thrown into the path of the vehicle even before the turning of the wheels would indicate.

By the means shown in Figs. 4 and 5 it will readily be seen that my mechanism can be adapted to be used with the lamps of any style of machine, whether said lamps be hung high or low on said machine.

While I have described one specific method for carrying my invention into effect it will readily be observed that the same may be modified without departing from the principle of the invention.

What I claim as new and my invention and desire to secure by Letters Patent is:

1. In a dirigible automobile lamp device of the character described, steering mechanism, lamps rigidly connected to the automobile frame, shutters associated with each of said lamps and mounted to swing at the front middle point of said lamps, means upon which said shutters are mounted capable of being moved upwardly or downwardly to raise or lower the shutters to fit lamps mounted at various heights, means for locking the last mentioned means in variable vertical position, and means between the means upon which said shutters are mounted and the inner hub of the wheels for forcing said shutters to automatically shift so that the light rays will be thrown in the path of the automobile.

2. In a dirigible automobile lamp device of the character described, steering mechanism, lamps rigidly connected to the automobile frame, shutters positioned in front of the middle part of said lamps, rods for supporting said shutters, rocker shafts upon which said rods are vertically adjustably mounted, and means between said rocker shafts and the inner hub of the wheels whereby the turning of the wheel rocks said rocker shafts to swing the shutters right or left to throw the light rays in the path of the moving automobile when the same travels out of a straight course.

3. The combination with a motor vehicle having steering mechanism and stationary lamps, of vertical reflectors rotatably mounted in front of said lamps, brackets fixed to said vehicle, vertically disposed extensible rods supported by said brackets and carrying said reflectors, means permitting the adjustment of said rods towards and away from the vehicle, and means operatively connecting said rods to the steering mechanism of the vehicle to cause said reflectors to move with the steering mechanism.

4. The combination with a motor vehicle having steering mechanism and stationary lamps, of forwardly extending brackets, means connecting the rear ends of said brackets to the front axle of the vehicle, a shaft mounted in each of said brackets, a bell-crank lever mounted on said shaft, an arm extending from said steering mechanism, a link pivotally connected to said arm and to one arm of the bell-crank lever, a vertical rod adjustably mounted in said bracket for movement toward and away from the vehicle, an arm fixed to said rod, a link pivotally connected to the last mentioned arm and to the other arm of the bell-crank lever, and a vertically disposed reflector carried by said rod and arranged in front of one of the vehicle lamps.

5. A combination as claimed in claim 4 in which said rod is formed of two parts adjustably connected together, and means for locking the parts of said rod in various adjusted positions.

6. A combination as claimed in claim 4 in which the means for connecting the rear ends of the brackets to the axle are adjustable to accommodate axles of various cross-sections.

7. The combination with a motor vehicle having steering mechanism and stationary lamps, of forwardly extending brackets having their rear ends fixedly connected to the front axle of the vehicle, shafts carried by said brackets, bell-crank levers mounted on said shafts, forwardly extending arms fixed to said steering mechanism, links pivotally connecting certain arms of the bell crank levers to said forwardly extending arms, other links having their rear ends pivotally connected to the other arms of said bell-crank levers, vertically arranged hollow rods slidably mounted in said brackets and arranged to move toward and away from the vehicle, fixed arms on said rods pivotally connected to the last mentioned links, adjustable extensions slidably mounted in said rods, means for locking said extensions in various adjusted positions, and reflectors carried by said extensions and arranged in front of said lamps.

In testimony whereof, I affix my signature at Cincinnati, Ohio, this 11th day of June, 1921.

CHARLES E. KISTNER.